United States Patent
Liao et al.

(10) Patent No.: US 10,078,214 B2
(45) Date of Patent: Sep. 18, 2018

(54) LIGHT SOURCE MODULE, PROJECTION DEVICE, AND DRIVING METHODS THEREOF

(71) Applicant: Coretronic Corporation, Hsin-Chu (TW)

(72) Inventors: Chien-Chung Liao, Hsin-Chu (TW); Chun-Ju Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/825,110

(22) Filed: Nov. 29, 2017

(65) Prior Publication Data
US 2018/0157028 A1   Jun. 7, 2018

(30) Foreign Application Priority Data

Dec. 1, 2016 (CN) .......................... 2016 1 1086703

(51) Int. Cl.
| | | |
|---|---|---|
| *G03B 21/20* | (2006.01) | |
| *G02B 26/00* | (2006.01) | |
| *H04N 9/31* | (2006.01) | |

(52) U.S. Cl.
CPC ....... *G02B 26/008* (2013.01); *G03B 21/2033* (2013.01); *H04N 9/31* (2013.01); *H04N 9/3155* (2013.01)

(58) Field of Classification Search
CPC .... G02B 26/008; G03B 21/2033; H04N 9/31; H04N 9/3155
See application file for complete search history.

(56) References Cited

U.S. PATENT DOCUMENTS

| | | | | |
|---|---|---|---|---|
| 2011/0205502 A1* | 8/2011 | Kato | ...................... | G03B 21/14 |
| | | | | 353/84 |
| 2012/0201030 A1 | 8/2012 | Yuan et al. | | |
| 2015/0316775 A1* | 11/2015 | Hsieh | ................. | G03B 21/2013 |
| | | | | 353/31 |

FOREIGN PATENT DOCUMENTS

| | | |
|---|---|---|
| CN | 101755300 | 6/2010 |
| CN | 101995750 | 3/2011 |
| CN | 102466954 | 5/2012 |
| CN | 102081292 | 9/2012 |
| CN | 102692799 | 10/2014 |
| TW | 201514962 | 4/2015 |

* cited by examiner

*Primary Examiner* — Sultan Chowdhury
*Assistant Examiner* — Magda Cruz
(74) *Attorney, Agent, or Firm* — JCIPRNET

(57) ABSTRACT

The invention discloses a light source module, a projection device and driving methods thereof, wherein a wavelength conversion device of the light source module has at least one wavelength conversion area for converting a blue beam provided by a blue light source into a converted beam, and the converted beam is transmitted to a wavelength selection element so that a first green beam is obtained by the wavelength selection element from at least a portion of the converted beam. According to the blue light source, a red light source, the wavelength conversion device and the wavelength selection element, the light source module provides an illumination beam corresponding to a first display mode or a second display mode.

18 Claims, 9 Drawing Sheets

LIGHT SOURCE MODULE, PROJECTION DEVICE, AND DRIVING METHODS THEREOF

CROSS-REFERENCE TO RELATED APPLICATION

This application claims the priority benefit of China application serial no. 201611086703.6, filed on Dec. 1, 2016. The entirety of the above-mentioned patent application is hereby incorporated by reference herein and made a part of this specification.

BACKGROUND OF THE INVENTION

Technical Field

The invention relates to an optical module and a display device, particularly to a light source module, a projection device, and driving methods thereof.

Description of Related Art

Currently, projection devices are required to have higher and higher color performance, and wider gamuts are becoming more popular with consumers. In order to achieve a wider gamut, a projection device may use two or more pure color light sources to provide beams of different colors. For example, in a projection device already including a blue light source, wider gamut performance may be achieved by adding a red light source. In such a projection device, a blue beam emitted from the blue light source excites phosphor powder that is disposed on a fluorescence wheel and that can be converted into green beams or yellow beams, so as to generate a green beam or a yellow beam. The green beam passes through a green filter of a filtering wheel to generate a green beam that meets requirements. A part of the yellow beam passes through a red filter to form a red light, and a part of the yellow beam passes through a transparent area of the filtering wheel to form a yellow beam having a narrower bandwidth. In addition, the blue beam is transmitted through a hollow part of the fluorescence wheel, and then passes through the transparent area of the filter color wheel to form a blue beam.

However, the scheme of such a projection device must include at least two color wheels, i.e., the fluorescence wheel and the filtering wheel, and the two color wheels must be synchronous. Thus, the overall cost of the projection device is higher and a higher degree of technical difficulty is also required. In addition, since a larger facula is formed on the filter color wheel by irradiation of the light beams, larger spoke light is formed at junctions of the color filter areas, which results in poorer performance in pure color and affects overall color quality. Also, during excitation at the fluorescence wheel and filtration at the filtering wheel, energy loss may occur in the colored light.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a light source module and a projection device having a wide gamut and less energy loss and are cost-efficient.

The invention provides a driving method of a light source module and a driving method of a projection device, wherein the light source module and the projection device driven by the driving methods have a wide gamut and less energy loss and are cost-efficient.

Other objectives and advantages of the invention may be further understood from the technical features disclosed in the invention.

To achieve one of, a part of or all of the above objectives or other objectives, an embodiment of the invention provides a light source module for providing an illumination beam. The light source module includes a blue light source, a red light source, a wavelength conversion device and a wavelength selection element. The blue light source is configured to provide a blue beam, and the red light source is configured to provide a first red beam. The wavelength conversion device is disposed on a transmission path of the blue beam. The wavelength conversion device has at least one wavelength conversion area and at least one light penetrating area, and the at least one wavelength conversion area and the at least one light penetrating area cut into the transmission path of the blue beam by turns. The at least one light penetrating area is configured to allow the blue beam to pass therethrough, and the at least one wavelength conversion area is configured to convert the blue beam into a converted beam. The wavelength selection element is disposed on a transmission path of the converted beam. Moreover, the converted beam is transmitted to the wavelength selection element so that a first green beam is obtained by the wavelength selection element from at least a portion of the converted beam. According to the blue light source, the red light source, the wavelength conversion device and the wavelength selection element, the light source module provides the illumination beam corresponding to a first display mode or a second display mode.

To achieve one of, a part of or all of the above objectives or other objectives, an embodiment of the invention provides a projection device including a light source module, an imaging element and a projection lens. The light source module is configured to provide an illumination beam, and the light source module includes a blue light source, a red light source, a wavelength conversion device and a wavelength selection element. The blue light source is configured to provide a blue beam, and the red light source is configured to provide a first red beam. The wavelength conversion device is disposed on a transmission path of the blue beam, and the wavelength conversion device has at least one wavelength conversion area and at least one light penetrating area. The at least one light penetrating area is configured to allow the blue beam to pass therethrough, and the at least one wavelength conversion area is configured to convert the blue beam into a converted beam. The wavelength selection element is disposed on a transmission path of the converted beam. Moreover, the converted beam is transmitted to the wavelength selection element so that a first green beam is obtained by the wavelength selection element from at least a part of the converted beam. According to the blue light source, the red light source, the wavelength conversion device and the wavelength selection element, the light source module provides the illumination beam corresponding to a first display mode or a second display mode. The imaging element is disposed on a transmission path of the illumination beam, and is configured to convert the illumination beam into an image beam. The projection lens is disposed on a transmission path of the image beam, and is configured to project the image beam onto a projection object.

To achieve one of, a part of or all of the above objectives or other objectives, an embodiment of the invention provides a driving method of a light source module, wherein the light source module includes a blue light source and is configured to provide an illumination beam. The driving method includes the following steps. A blue beam provided by the blue light source is converted into a converted beam by at least one wavelength conversion area of a wavelength conversion device. The converted beam is transmitted to a wavelength selection element so that a first green beam is obtained by the wavelength selection element from at least a portion of the converted beam. According to the blue light source, a red light source, the wavelength conversion device and the wavelength selection element, the illumination beam corresponding to a first display mode or a second display mode is provided.

To achieve one of, a part of or all of the above objectives or other objectives, an embodiment of the invention provides a driving method of a projection device, wherein the projection device includes a light source module, and the light source module includes a blue light source and is configured to provide an illumination beam. The driving method includes the following steps. A blue beam provided by the blue light source is converted into a converted beam by at least one wavelength conversion area of a wavelength conversion device. The converted beam is transmitted to a wavelength selection element so that a first green beam is obtained by the wavelength selection element from at least a portion of the converted beam. According to the blue light source, a red light source, the wavelength conversion device and the wavelength selection element, the illumination beam corresponding to a first display mode or a second display mode is provided. The illumination beam is converted into an image beam. The image beam is projected onto a projection object.

Based on the above, the embodiments of the invention at least have one of the following advantages or effects. In the embodiments of the invention, at least one wavelength conversion area of the wavelength conversion device is configured to convert the blue beam into the converted beam, and the converted beam is transmitted through the wavelength selection element so that the first green beam is obtained by the wavelength selection element from at least a portion of the converted beam. According to the blue light source, the red light source, the wavelength conversion device and the wavelength selection element, the light source module provides the illumination beam corresponding to the first display mode or the second display mode. In addition, in the first display mode, the blue light source is turned on and the red light source is turned off, so as to obtain the first green beam satisfying a requirement of the first display mode. In the second display mode, the blue light source and the red light source are both turned on, and the first green beam is combined with the first red beam.

In the exemplary embodiments of the invention, according to actual requirements, a user may make the light source module provide the illumination beam corresponding to different display modes, such as a wide gamut display mode and a high brightness display mode, so as to meet various user needs. In addition, the light source module is capable of obtaining a desired colored light by filtration with only a fluorescence wheel and with no filter color wheel. Thus, the cost is effectively lowered and energy loss is effectively reduced. Furthermore, a problem of spoke light on the filter color wheel is avoided, and color purity performance is effectively improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
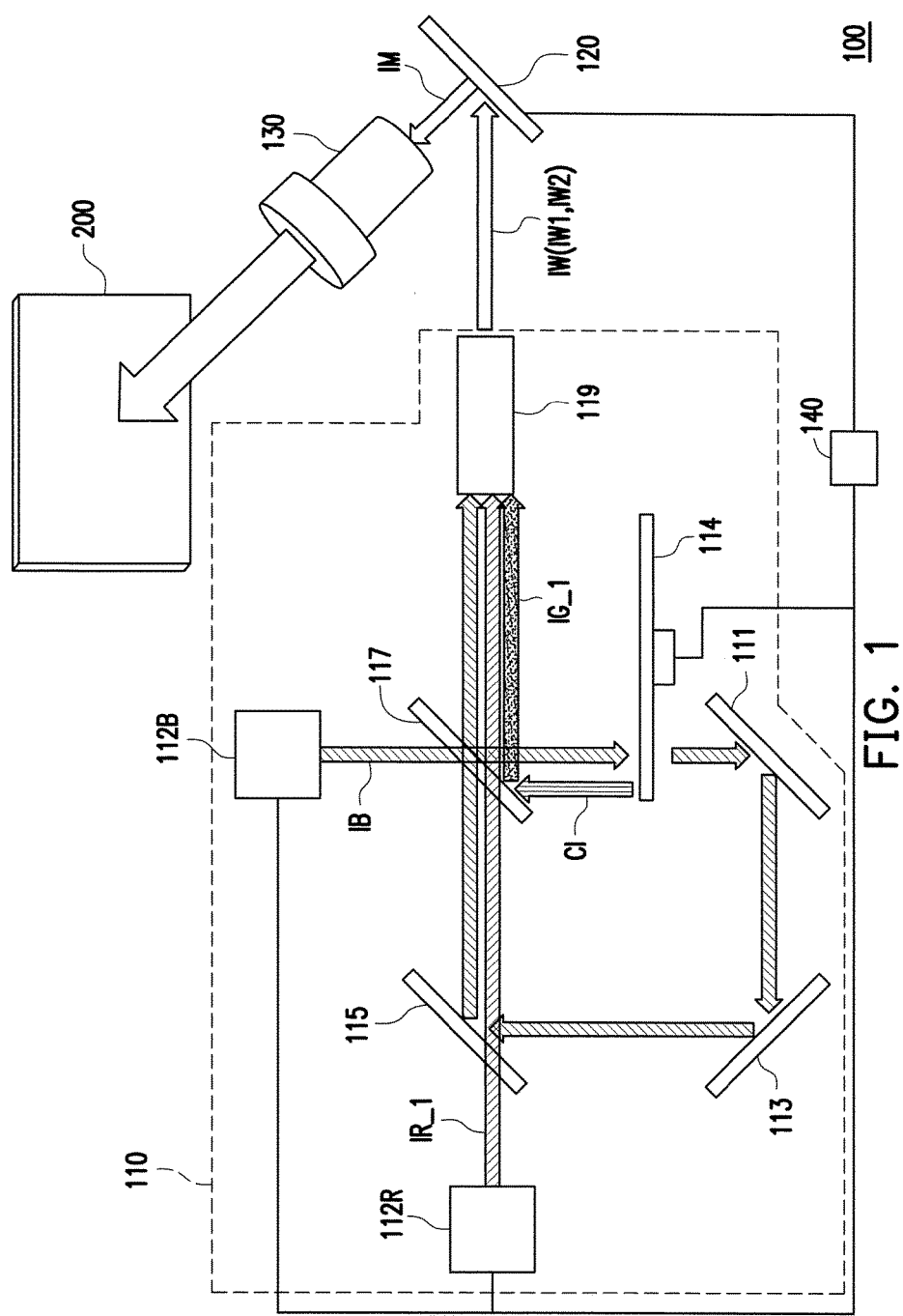
FIG. 1 illustrates a schematic view of a projection device according to an embodiment of the invention.

FIG. 1 illustrates a schematic view of a projection device according to an embodiment of the invention. Referring to FIG. 1, in the embodiment, a projection device 100 includes a light source module 110, an imaging element 120 and a projection lens 130. The light source module 110 is configured to provide an illumination beam IW which is used as a light beam for projecting an image. The imaging element 120 is disposed on a transmission path of the illumination beam IW, and is configured to convert the illumination beam IW into an image beam IM. The projection lens 130 is disposed on a transmission path of the image beam IM, and is configured to project the image beam IM onto a projection object 200 such as a screen or a wall surface.

In the embodiment, the imaging element 120 is configured to convert the illumination beam IW from the light source module 110 into the image beam IM. Specifically, the imaging element 120 is, for example, a reflective type light modulator, such as a liquid crystal on silicon (LCoS) panel, a digital micromirror device (DMD) or the like. In an embodiment, the imaging element 120 is, for example, a transmissive type light modulator, such as a transparent liquid crystal panel, an electro-optical modulator, a magneto-optic modulator, an acousto-optic modulator (AOM) or the like. However, the invention does not limit the form and type of the imaging element 120. In the embodiment, detailed steps and implementation manners of a method for converting the illumination beam IW into the image beam IM by the imaging element 120 will be omitted since sufficient teachings, suggestions and descriptions of implementation can be obtained from common knowledge in the art.

In the embodiment, the projection lens 130, for example, includes a set of one or more optical lenses having refractive power, such as a set of nonplanar lenses such as biconcave lenses, biconvex lenses, concave-convex lenses, convex-concave lenses, plano-convex lenses and plano-concave lenses, and so on. In an embodiment, the projection lens 130 may include a planar optical lens, and is capable of reflectively or transmissively projecting the image beam IM from the imaging element 120 onto the projection object 200. The invention does not limit the form and type of the projection lens 130.

Figure 2:
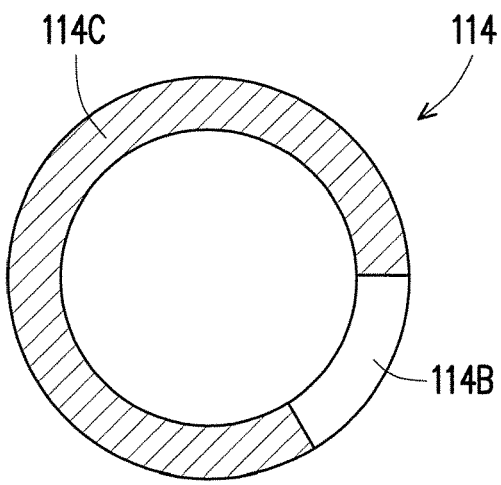
FIG. 2 illustrates a schematic view of a wavelength conversion device in the embodiment in FIG. 1.

FIG. 2 illustrates a schematic view of a wavelength conversion device in the embodiment in FIG. 1. Referring to FIG. 1 and FIG. 2 together, in the embodiment, the light source module 110 includes a blue light source 112B, a red light source 112R, a wavelength conversion device 114 and a wavelength selection element 117. The blue light source 112B is configured to provide a blue beam IB, and the red light source 112R is configured to provide a first red beam IR_1. Specifically, the wavelength conversion device 114 is disposed on a transmission path of the blue beam IB. The wavelength conversion device 114 is, for example, a wavelength conversion wheel, which is an apparatus converting a wavelength of the blue beam IB into a different wavelength, and examples thereof include a phosphor wheel or a fluorescence wheel. However, the invention is not limited thereto. The wavelength conversion device 114 has at least one wavelength conversion area 114C and at least one light penetrating area 114B (as shown in FIG. 2), and the at least one wavelength conversion area 114C and the at least one light penetrating area 114B cut into the transmission path of the blue beam IB by turns.

In detail, the wavelength conversion device 114 rotates to cause the at least one wavelength conversion area 114C and the at least one light penetrating area 114B to cut into the transmission path of the blue beam IB by turns. The at least one light penetrating area 114B is configured to allow the blue beam IB to pass therethrough, and the at least one wavelength conversion area 114C is configured to convert the blue beam IB into a converted beam CI. In the embodiment, the at least one wavelength conversion area 114C includes phosphor powder coated on a surface of the at least one wavelength conversion area 114C facing the blue beam IB. The phosphor powder is, for example, phosphor powder that can converts the blue beam IB into green beam, phosphor powder that can converts the blue beam IB into yellow beam or phosphor powder that can converts the blue beam IB into light beam of any other color. Moreover, the converted beam CI is, for example, a green beam, a yellow beam or a light beam of any other color, corresponding to the types of the phosphor powder. In addition, the at least one light penetrating area 114B is, for example, a hollowed-out hole, or a transparent plate disposed in the area, so as to allow the blue beam IB to pass therethrough. However, in some embodiments, a diffusion plate may be disposed in the at least one light penetrating area 114B, so as to adjust a light shape of the blue beam IB or remove the speckle from the blue light source 112B as the blue beam IB passes through the at least one light penetrating area 114B. Alternatively, a transparent plate having a plurality of through holes or a diffusion plate having a plurality of through holes may be disposed in the at least one light penetrating area 114B, so as to reduce energy loss of the blue beam IB. The invention is not limited thereto.

Referring still to FIG. 1, in the embodiment, the wavelength selection element 117 is disposed on a transmission path of the converted beam CI. Moreover, the converted beam CI is transmitted to the wavelength selection element 117 so that a first green beam IG_1 is obtained by the wavelength selection element 117 from at least a portion of the converted beam CI. Specifically, the wavelength selection element 117 is, for example, a dichroic member which reflects light beams in specific wavelength ranges and allows light beams in other wavelength ranges to pass therethrough, or a dichroic member which allows light beams in specific wavelength ranges to pass therethrough and reflects light beams in other wavelength ranges. In the embodiment, the wavelength selection element 117 is, for example, a reflection filter disposed on the transmission path of the converted beam CI and also on transmission paths of the blue beam IB and the first red beam IR_1. In the embodiment, the wavelength selection element 117 reflects at least a portion of the converted beam CI in a specific wavelength range, and the at least a portion of the converted beam CI reflected by the wavelength selection element 117 forms the first green beam IG_1. In detail, a wavelength range of the converted beam CI at least covers a wavelength range of the first green beam IG_1 filtered by the wavelength selection element 117, i.e., the wavelength range of the first green beam IG_1 is smaller than or equal to the wavelength range of the converted beam CI. For example, in the embodiment shown in FIG. 1, a peak wavelength of the first red beam IR_1 is 634 nm and a peak wavelength of the blue beam IB is 455 nm. The wavelength selection element 117 reflects a light beam in the wavelength range of 509 nm to 573 nm and allows light beams in other wavelength bands to pass therethrough. Therefore, the first red beam IR_1 and the blue beam IB are allowed to pass through the wavelength selection element 117. The converted beam CI is transmitted to the wavelength selection element 117, and the at least portion of the converted beam CI having wavelength range of 509 nm to 573 nm is reflected by the wavelength selection element 117 to obtain the first green beam IG_1. The first green beam IG_1 satisfies green color value of the DCI-P3 color gamut. However, the invention is not limited thereto. In other embodiments, the wavelength range of the first green beam IG_1 is suitably designed according to actual requirements.

In addition, in the embodiment, the light source module 110 further includes a plurality of reflection elements 111 and 113, a wavelength selection element 115, and an integration rod 119. The reflection elements 111 and 113 are disposed on the transmission path of the blue beam IB, and are configured to adjust the transmission path of the blue beam IB. In addition, the wavelength selection element 115 is disposed on the transmission paths of the blue beam IB and the first red beam IR_1. In detail, the wavelength selection element 115 and the wavelength selection element 117 are, for example, light combination elements. The wavelength selection element 115 is configured to combine the first red beam IR_1 emitted from the red light source 112R with the blue beam IB passing through the wavelength conversion device 114, and the wavelength selection element 117 is configured to combine the first red beam IR_1 transmitted from the wavelength selection element 115, the blue beam IB transmitted from the wavelength selection element 115 and the first green beam IG_1. In the embodiment shown in FIG. 1, the blue beam IB emitted from the blue light source 112B passes through, in sequence, the wavelength selection element 117, and the at least one light penetrating area 114B of the wavelength conversion device 114. The blue beam IB from the at least one light penetrating area 114B is reflected by, in sequence, the reflection elements 111 and 113 and the wavelength selection element 115, and is then transmitted back to the wavelength selection element 117. The blue beam IB emitted from the blue light source 112B passes through the wavelength selection element 117 and is transmitted to the wavelength conversion device 114. The at least one wavelength conversion area 114C of the wavelength conversion device 114 converts the blue beam IB into the converted beam CI. The converted beam CI outputted from the at least one wavelength conversion area 114C is transmitted to the wavelength selection element 117. The first red beam IR_1 emitted from the red light source 112R passes through the wavelength selection element 115 and is then transmitted to the wavelength selection element 117. The wavelength selection element 117 allows the blue beam IB and the first red beam IR_1 to pass therethrough and reflects at least a portion of the converted beam CI. so as to obtain the first green beam IG_1 by the wavelength selection element 117 from the at least a portion of the converted beam CI, and further combines the first red beam IR_1, the blue beam IB and the first green beam IG_1. In addition, the integration rod 119 is disposed on the transmission paths of the blue beam IB, the first red beam IR_1 and the first green beam IG_1. The blue beam IB and the first red beam IR_1 that have passed through the wavelength selection element 117 and the first green beam IG_1 filtered by the wavelength selection element 117 sequentially enter the integration rod 119 so that the integration rod 119 outputs the illumination beam IW. Specifically, the integration rod 119 is configured to homogenize light beams and then accurately outputting it from the light source module 110, so as to make an image projected onto the projection object 200 uniform in brightness and color and to avoid a problem of nonuniformity in the projection device 100 in terms of optical path and brightness.

In the embodiment, the light source (the blue light source 112B and the red light source 112R) used by the light source module 110 is, for example, a laser diode (LD) or laser diode array such as a laser diode bank. Alternatively, the light source used by the light source module 110 may be a light-emitting diode (LED) or an organic light-emitting diode (OLED). Specifically, any light source that meets volume requirements in actual design may be implemented, and the invention is not limited thereto. In addition, in the embodiment, numbers and installation positions of the reflection elements 111 and 113, the wavelength selection elements 115 and 117, and the integration rod 119 are only for exemplary purposes and are not intended to limit the invention. The numbers and installation positions may be adjusted according to different optical structures of the light source module 110.

Figure 6:
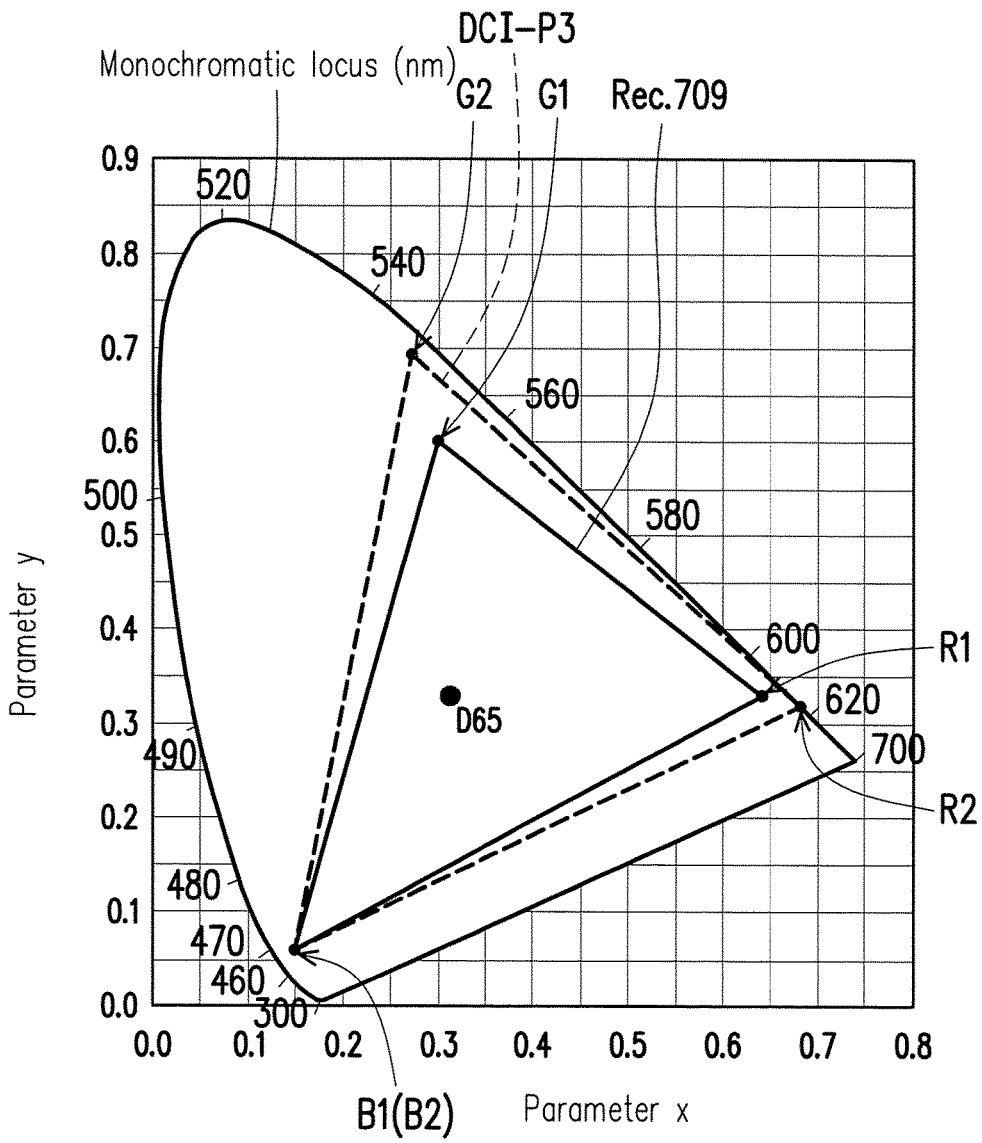
FIG. 6 illustrates a region defined by a Rec.709 color gamut and a region defined by a DCI-P3 color gamut in a CIE 1931 color space chromaticity diagram.

Referring to FIG. 6, FIG. 6 illustrates a region defined by a Rec.709 color gamut and a region defined by a DCI-P3 color gamut in a CIE 1931 color space chromaticity diagram. The CIE 1931 color space is a color space mathematically defined by the International Commission on Illumination (CIE) in 1931. In FIG. 6, the horizontal axis labeled "parameter x" and the vertical axis labeled "parameter y" define chromaticity of colors through coordinates. Coordinate points on a "monochromatic locus" represent coordinate points corresponding to chromaticity performance of a monochromatic light having a specific wavelength, and a wavelength of the monochromatic light is expressed in nanometers (nm). For example, a point labeled 520 on the "monochromatic locus" in FIG. 6 represents a coordinate point corresponding to chromaticity performance of a monochromatic light having a wavelength of 520 nm. In addition, in FIG. 6, the region labeled "Rec.709" in the CIE 1931 color space chromaticity diagram represents the region defined by the Rec.709 color gamut. Coordinate points R1, G1 and B1 respectively represent a red coordinate point (0.64, 0.33), a green coordinate point (0.3, 0.6) and a blue coordinate point (0.15, 0.06) that define the Rec.709 color gamut. The region labeled "DCI-P3" in the CIE 1931 color space chromaticity diagram represents the region defined by the DCI-P3 color gamut. Coordinate points R2, G2 and B2 respectively represent a red coordinate point (0.68, 0.32), a green coordinate point (0.265, 0.69) and a blue coordinate point (0.15, 0.06) that define the DCI-P3 color gamut. Specifically, the region defined by the DCI-P3 color gamut is larger than the region defined by the Rec.709 color gamut. For example, when a viewer views a green light satisfying the green color value (the green coordinate point G1) of the Rec.709 color gamut and a green light satisfying the green color value (the green coordinate point G2) of the DCI-P3 color gamut, respectively, the viewer may feel that the color of the green light satisfying the green color value of the DCI-P3 color gamut is purer than that of the green light satisfying the green color value of the Rec.709 color gamut.

Referring to FIG. 6 and FIG. 1 together, in the embodiment, the light source module 110 is configured to provide, according to the blue light source 112B, the red light source 112R, the wavelength conversion device 114 and the wavelength selection element 117, the illumination beam IW corresponding to a first display mode or a second display mode, wherein the first green beam IG_1 filtered by the wavelength selection element 117 satisfies the requirement of the first display mode. Specifically, the first display mode is, for example, a wide gamut mode. When the light source module 110 is in the first display mode, the illumination beam IW provided by the light source module 110 is a first illumination beam IW1 satisfying the requirement of the first display mode, and the imaging element 120 converts the first illumination beam IW1 outputted from the light source module 110 into the image beam IM corresponding to the first display mode. At this moment, the first green beam IG_1 filtered by the wavelength selection element 117, for example, satisfies or is close to the green color value (the green coordinate point) of the DCI-P3 color gamut, and color performance of the image beam IM projected by the projection device 100 onto the projection object 200, for example, satisfies or is close to the DCI-P3 color gamut. In addition, the second display mode is, for example, a high brightness mode. When the light source module 110 is in the second display mode, the illumination beam IW provided by the light source module 110 is a second illumination beam IW2 satisfying the requirement of the second display mode, and the imaging element 120 converts the second illumination beam IW2 outputted from the light source module 110 into the image beam IM corresponding to the second display mode. At this moment, the color performance of the image beam IM projected by the projection device 100 onto the projection object 200, for example, satisfies or is close to the Rec.709 color gamut. However, in some embodiments, the color performance and optical performance of the image beam IM of the projection device 100 in the first display mode and in the second display mode may be designed according to actual requirements, so that the illumination beam IW (the first illumination beam IW1) corresponding to the first display mode or the illumination beam IW (the second illumination beam IW2) corresponding to the second display mode provided by the light source module 110 may comply with other color gamut standards or satisfy other display requirements. The invention is not limited thereto.

Figure 3A:
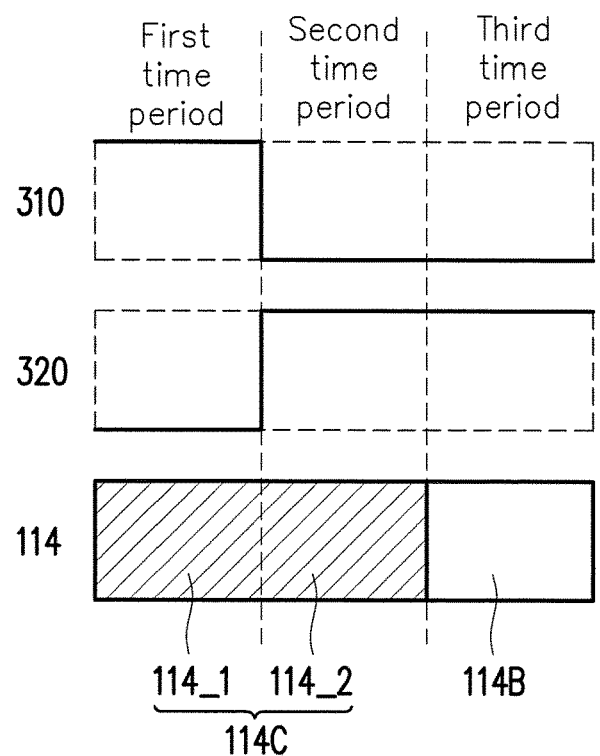
FIG. 3A to FIG. 3D illustrate schematic views of currents for driving light sources in different operation modes of a projection device using the wavelength conversion device in FIG. 2.

FIG. 3A to FIG. 3D illustrate schematic views of currents for driving light sources in different operation modes of a projection device using the wavelength conversion device in FIG. 2. In different embodiments, the wavelength conversion area 114C of the wavelength conversion device 114 includes different numbers of subareas according to different operation modes. Referring first to FIG. 3A and FIG. 2 together, specifically, the wavelength conversion device 114 includes at least one wavelength conversion area 114C and at least one light penetrating area 114B. In operation modes of different embodiments, the wavelength conversion area 114C includes at least one first subarea and at least one second subarea. For example, in the operation mode of the embodiment in FIG. 3A, the wavelength conversion area 114C includes one first subarea 114_1 and one second subarea 114_2 (shown in FIG. 3A but not shown in FIG. 2). In the embodiment, the first subarea 114_1, the second subarea 114_2 and the light penetrating area 114B on the wavelength conversion device 114 are arranged in sequence in a ring shape. The wavelength conversion device 114 rotates to cause the first subarea 114_1, the second subarea 114_2 and the light penetrating area 114B to cut into the transmission path of the blue beam IB by turns.

Referring to FIG. 1, FIG. 2 and FIG. 3A, firstly, when the first subarea 114_1 of the wavelength conversion device 114 cuts into the transmission path of the blue beam IB, the red light source 112R is turned on to provide the first red beam IR_1. When the second subarea 114_2 of the wavelength conversion device 114 subsequently cuts into the transmission path of the blue beam IB, the blue light source 112B is turned on to provide the blue beam IB, and the red light source 112R is turned off. The blue beam IB is converted into the converted beam CI by the phosphor powder disposed on the second subarea 114_2, and the converted beam CI is transmitted to the wavelength selection element 117 so that the first green beam IG_1 is obtained by the wavelength selection element 117 from at least a portion of the converted beam CI. In addition, when the light penetrating area 114B cuts into the transmission path of the blue beam IB, the red light source 112R is turned off and the blue light source 112B remains turned on, so as to provide the blue beam IB which passes through the light penetrating area 114B. Specifically, in the operation mode of the embodiment in FIG. 3A, during a first time period, the first subarea 114_1 cuts into the transmission path of the blue beam IB. At this moment, a current 310 for driving the red light source 112R is at a high level, so that the red light source 112R is turned on to provide the first red beam IR_1, while the blue light source 112B is turned off. During a second time period, the second subarea 114_2 subsequently cuts into the transmission path of the blue beam IB. At this moment, a current 320 for driving the blue light source 112B is changed to a high level, so that the blue light source 112B is turned on to provide the blue beam IB and the blue beam IB is configured to generate the first green beam IG_1, while the red light source 112R is turned off. In addition, during a third time period, the light penetrating area 114B subsequently cuts into the transmission path of the blue beam IB. At this moment, the current 320, for example, remains at the high level, so that the blue light source 112B remains turned on and the red light source 112R remains turned off, so as to provide the blue beam IB. In other words, in the operation mode of the embodiment, the first subarea 114_1, the second subarea 114_2 and the light penetrating area 114B of the wavelength conversion device 114 cut into the transmission path of the blue beam IB in sequence during the first time period, the second time period and the third time period, respectively, wherein the red light source 112R is turned on during the first time period, and the blue light source 112B is turned on during the second time period and the third time period. In addition, the light source module 110 provides the first red beam IR_1, the first green beam IG_1 and the blue beam IB in sequence during the first time period, the second time period and the third time period, respectively, so as to form the illumination beam IW (the first illumination beam IW1). By continuously rotating the wavelength conversion device 114 and repeatedly and sequentially performing the operations in the first time period, the second time period and the third time period, the light source module 110 provides the illumination beam IW in an RGB format in a continuous and sequential manner. Specifically, the operation mode of the embodiment in FIG. 3A is performed when, for example, the light source module 110 is in the first display mode (wide gamut mode), and the illumination beam IW (the first illumination beam IW1) corresponds to the first display mode. That is, the first red beam IR_1, the first green beam IG_1 and the blue beam IB all satisfy or are close to the DCI-P3 color gamut.

Figure 3B:
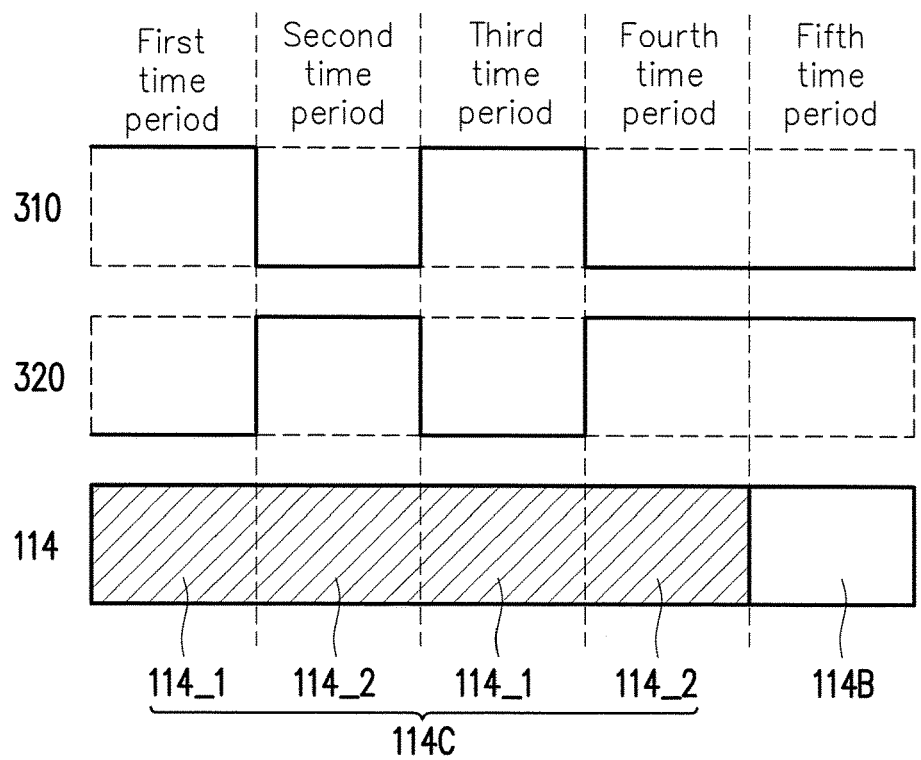

Next, referring to FIG. 3B and FIG. 2 together, specifically, the operation mode in FIG. 3B is similar to the operation mode in FIG. 3A. A difference lies in that in the operation mode in FIG. 3B, at least one first subarea of the wavelength conversion area 114C is a plurality of first subareas 114_1, and at least one second subarea of the wavelength conversion area 114C is a plurality of second subareas 114_2. In addition, these first subareas 114_1 and second subareas 114_2 are alternately arranged. In the embodiment, on the wavelength conversion device 114, one of the first subareas 114_1, one of the second subareas 114_2, another of the first subareas 114_1, another of the second subareas 114_2 and the light penetrating area 114B are arranged in sequence in a ring shape, and cut into the transmission path of the blue beam IB by turns.

Similarly to the operation mode in FIG. 3A, in the operation mode in FIG. 3B, the one of the first subareas 114_1, the one of the second subareas 114_2, the another of the first subareas 114_1, the another of the second subareas 114_2 and the light penetrating area 114B of the wavelength conversion device 114 cut into the transmission path of the blue beam IB in sequence during a first time period, a second time period, a third time period, a fourth time period and a fifth time period, respectively, wherein during the first time period and the third time period, the red light source 112R is turned on and the blue light source 112B is turned off; during the second time period, the fourth time period and the fifth time period, the blue light source 112B is turned on and the red light source 112R is turned off. In addition, by continuously rotating the wavelength conversion device 114 and repeatedly and sequentially performing the operations in the first time period, the second time period, the third time period, the fourth time period and the fifth time period, the light source module 110 provides the first red beam IR_1, the first green beam IG_1, the first red beam IR_1, the first green beam IG_1 and the blue beam IB in sequence during the first time period, the second time period, the third time period, the fourth time period and the fifth time period, respectively, so as to form the illumination beam IW (the first illumination beam IW1). That is, the light source module 110 provides the illumination beam IW in an RGRGB format in a continuous and sequential manner. Specifically, the operation mode of the embodiment in FIG. 3B is performed when, for example, the light source module 110 is in the first display mode (wide gamut mode), and the illumination beam IW (the first illumination beam IW1) corresponds to the first display mode. That is, the first red beam IR_1, the first green beam IG_1 and the blue beam IB all satisfy or are close to the DCI-P3 color gamut.

Figure 3C:
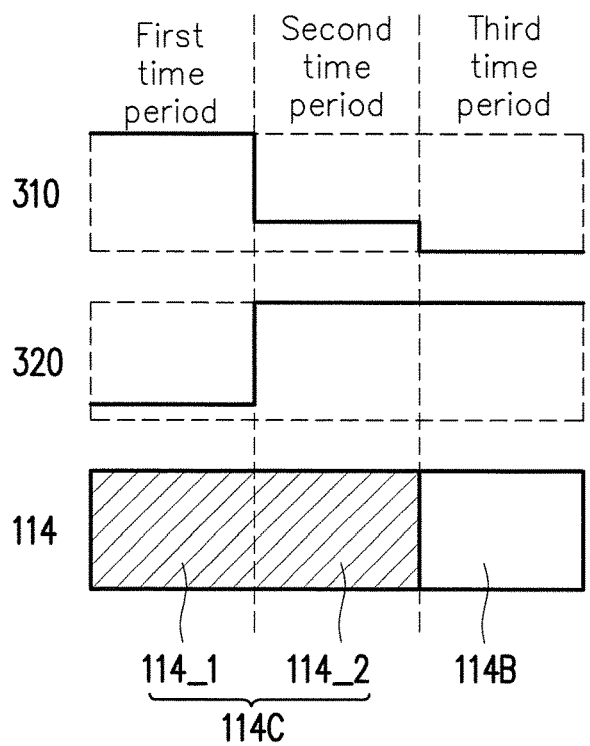

Referring to FIG. 3C, FIG. 1 and FIG. 2 together, specifically, in the operation mode in FIG. 3C, the wavelength conversion area 114C includes one first subarea 114_1 and one second subarea 114_2. On the wavelength conversion device 114, the first subarea 114_1, the second subarea 114_2 and the light penetrating area 114B are arranged in sequence in a ring shape, and cut into the transmission path of the blue beam IB by turns. The operation mode of the embodiment is performed when, for example, the light source module 110 is in the second display mode (high brightness mode). In the embodiment, when the light source module 110 is in the second display mode and at least one wavelength conversion area 114C cuts into the transmission path of the blue beam IB, the red light source 112R and the blue light source 112B are both turned on to provide the first red beam IR_1 and the blue beam IB, wherein the blue beam IB is configured to generate the first green beam IG_1, and the first green beam IG_1 is combined with the first red beam IR_1.

Specifically, in the operation mode of the embodiment in FIG. 3C, during a first time period, the first subarea 114_1 cuts into the transmission path of the blue beam IB. At this moment, the red light source 112R and the blue light source 112B are both turned on, so as to respectively provide the first red beam IR_1 and the first green beam IG_1. The first red beam IR_1 and the first green beam IG_1 are combined by, for example, the wavelength selection element 117, so as to obtain a second red beam (not shown) satisfying a requirement of the second display mode. In detail, during the first time period, the current 320 for driving the blue light source 112B, for example, remains at a lower level, and the blue light source 112B is turned on to provide the blue beam IB having smaller light intensity, which correspondingly generates the first green beam IG_1 having smaller light intensity. That is, when the current 320 for the blue light source 112B is at a lower level, the light intensity of the blue beam IB provided by the blue light source 112B is smaller as compared to the light intensity of the blue beam IB when the current 320 is at a high level, and is also smaller as compared to the light intensity of the first red beam IR_1 when the current 310 for the red light source 112R is at a high level. For example, during the first time period, the light intensity of the first green beam IG_1 is smaller than or equal to one half the light intensity of the first red beam IR_1. Accordingly, a color coordinate point of the second red beam in FIG. 6 is, for example, located at or close to a red color value (the red coordinate point R1) defined by the Rec.709 color gamut.

In addition, in the operation mode of the embodiment in FIG. 3C, during a second time period, the second subarea 114_2 cuts into the transmission path of the blue beam IB. At this moment, the red light source 112R and the blue light source 112B are both turned on, so as to respectively provide the first red beam IR_1 and the first green beam IG_1. The first red beam IR_1 and the first green beam IG_1 are combined by, for example, the wavelength selection element 117, so as to obtain a second green beam (not shown) satisfying a requirement of the second display mode. In detail, during the second time period, the current 310 for driving the red light source 112R, for example, remains at a lower level, and only the red light source 112R is turned on to provide the first red light beam IR_1 having smaller light intensity. That is, when the current 310 for the red light source 112R is at a lower level, the light intensity of the first red light beam IR_1 provided by the red light source 112R is smaller as compared to the light intensity of the first red light beam IR_1 when the current 310 is at a high level, and is also smaller as compared to the light intensity of the blue beam IB when the current 320 for the blue light source 112B is at a high level. For example, during the second time period, the light intensity of the first red beam IR_1 is smaller than or equal to one half the light intensity of the first green beam IG_1. Accordingly, a color coordinate point of the second green beam in FIG. 6 is, for example, located at or close to a green color value (the green coordinate point G1) defined by the Rec.709 color gamut.

Specifically, in the operation mode in FIG. 3C, the first subarea 114_1, the second subarea 114_2 and the light penetrating area 114B of the wavelength conversion device 114 cut into the transmission path of the blue beam IB in sequence during the first time period, the second time period and a third time period, respectively, wherein the red light source 112R is turned on during the first time period and the second time period, and the blue light source 112B is turned on during the first time period, the second time period and the third time period. In addition, by continuously rotating the wavelength conversion device 114 and repeatedly and sequentially performing the operations in the first time period, the second time period and the third time period, the light source module 110 continuously provides the second red beam, the second green beam and the blue beam IB in sequence during the first time period, the second time period and the third time period, respectively, so as to form the illumination beam IW (the second illumination beam IW2). That is, the light source module 110 provides the illumination beam IW in the RGB format in a continuous and sequential manner. Specifically, the operation mode of the embodiment in FIG. 3C is performed when, for example, the light source module 110 is in the second display mode (high brightness mode), and the illumination beam IW (the second illumination beam IW2) corresponds to the second display mode. That is, the second red beam, the second green beam and the blue beam IB all satisfy or are close to the Rec.709 color gamut. In detail, during the first time period, the blue light source 112B is also turned on to adjust the second red beam to be located at or close to the red coordinate point R1 as in the CIE 1931 color space chromaticity diagram in FIG. 6, and during the second time period, the red light source 112R is also turned on to adjust the second green beam to be located at or close to the green coordinate point G1 as in the CIE 1931 color space chromaticity diagram in FIG. 6. Thus, in the second display mode (high brightness mode), the illumination beam IW (the second illumination beam IW2) has higher brightness while satisfying or being close to the Rec.709 color gamut.

Specifically, the projection device 100 further includes a processor 140. A user transmits a mode adjustment signal to the processor 140 via an operation interface (not shown), and the processor 140 of the projection device 100 generates a control signal according to the mode adjustment signal and transmits the control signal to the light source module 110. The light source module 110 is adjusted according to the control signal transmitted from the processor 140, so as to provide the illumination beam IW (the first illumination beam IW1 or the second illumination beam IW2) corresponding to the first display mode (wide gamut mode) or the second display mode (high brightness mode). In an embodiment, when the light source module 110 of the projection device 100 is in the first display mode (wide gamut mode), the user adjusts the light source module 110 from the first display mode to the second display mode via the operation interface; or, when the light source module 110 of the projection device 100 is in the second display mode (high brightness mode), the user adjusts the light source module 110 from the second display mode to the first display mode through the operation interface. The operation interface may be a control panel disposed on the projection device 100, or a handheld controller such as a remote control or the like wired or wireless connected to the processor 140 of the projection device 100. In addition, the processor 140 of the projection device 100 is disposed inside the projection device 100 and is electrically connected to the blue light source 112B, the red light source 112R, the wavelength conversion device 114 and the imaging element 120, respectively, for adjusting operations of the above elements.

The processor 140 of the projection device 100 includes, for example, a central processing unit (CPU), a microprocessor, an image scaler, a digital signal processor (DSP), a programmable controller, a programmable logic device (PLD), or other similar device, or a combination thereof. The invention is not limited thereto.

In another embodiment, the control signal may be a preset signal stored in a storage element. The processor 140, after reading the preset signal from the storage element, generates the control signal and transmits it to the light source module 110, so as to adjust the light source module 110 to provide the illumination beam corresponding to the first display mode (wide gamut mode) or the second display mode (high brightness mode). The storage element is, for example, one selected from the following several types of memories: a volatile memory (e.g., a dynamic random-access memory (DRAM), a static RAM (SRAM), or a synchronous dynamic RAM (SDRAM)), a nonvolatile memory (e.g., a one-time programmable read-only memory (OTPROM), a programmable ROM (PROM), an erasable and programmable ROM (EPROM), an electrically erasable and programmable ROM (EEPROM), a mask ROM and a flash ROM), a hard disk drive (HDD), and a solid-state drive (SSD).

In an embodiment, according to the control signal, the light source module 110 is adjusted to the first display mode (wide gamut mode), and provides the illumination beam IW (the first illumination beam IW1) corresponding to the first display mode in, for example, the operation mode of the embodiment in FIG. 3A. At this moment, the illumination beam IW, for example, satisfies or is close to the DCI-P3 color gamut. In addition, the user may adjust the light source module 110 to the second display mode (high brightness mode), so that the light source module 110 provides the illumination beam IW (the second illumination beam IW2) corresponding to the second display mode in, for example, the operation mode of the embodiment in FIG. 3C. At this moment, the illumination beam IW, for example, satisfies or is close to the Rec.709 color gamut and has higher brightness. That is, according to actual requirements, the user may make the light source module 110 of the projection device 100 provide the illumination beam IW corresponding to different display modes, such as the wide gamut display mode and the high brightness display mode, so as to meet various user needs. In addition, the light source module 110 of the projection device 100 is capable of obtaining a desired colored light, for example, a colored light satisfying or close to the DCI-P3 color gamut, by filtration with only the fluorescence wheel and with no filter color wheel. Thus, the cost is effectively lowered and energy loss is effectively reduced. In addition, the problem of spoke light on the filter color wheel is avoided, and color purity performance is effectively improved.

Figure 3D:
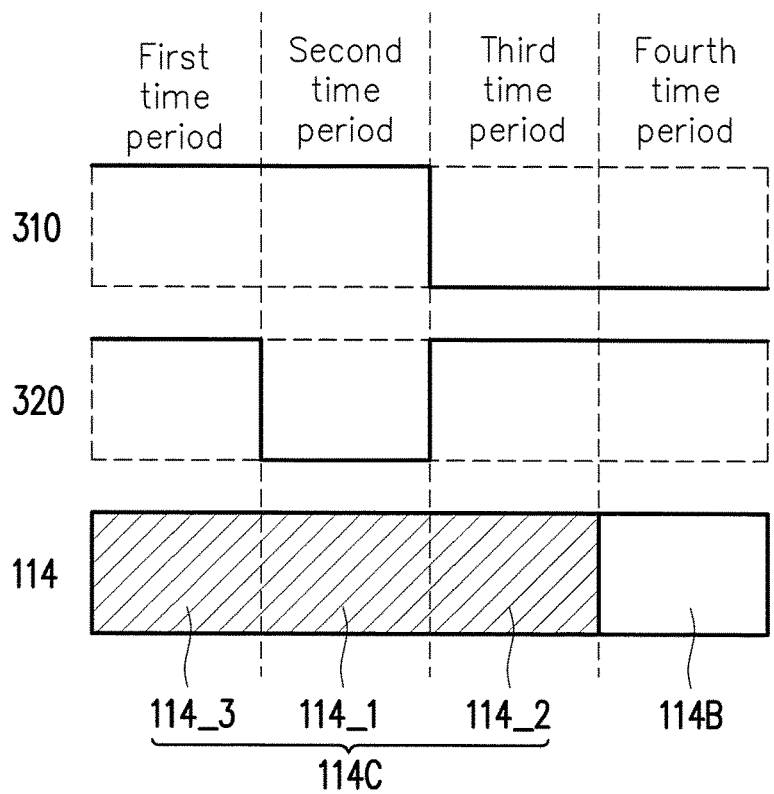

Next, referring to FIG. 3D and FIG. 2 together, in the operation mode in FIG. 3D, the wavelength conversion area 114C includes at least one first subarea, at least one second subarea and at least one third subarea. Specifically, the wavelength conversion area 114C of the embodiment includes one first subarea 114_1, one second subarea 114_2 and one third subarea 114_3, wherein the third subarea 114_3, the first subarea 114_1 and the second subarea 114_2 are, for example, arranged adjacent to one another in a ring shape. That is, on the wavelength conversion device 114, the third subarea 114_3, the first subarea 114_1, the second subarea 114_2 and the light penetrating area 114B are arranged in sequence in a ring shape, and cut into the transmission path of the blue beam IB by turns. When the third subarea 114_3 cuts into the transmission path of the blue beam IB, the red light source 112R and the blue light source 112B are both turned on. That is, the current 310 for driving the red light source 112R and the current 320 for driving the blue light source 112B are both at high levels, for providing the first red beam IR_1 and the blue beam IB respectively. Moreover, the blue beam IB is converted into the converted beam CI by the phosphor powder on the third subarea 114_3, and the converted beam CI is transmitted to the wavelength selection element 117 so that the first green beam IG_1 is obtained by the wavelength selection element 117 from at least a portion of the converted beam CI. In addition, in the embodiment, the first red beam IR_1 and the first green beam IG_1 are combined by, for example, the wavelength selection element 117, so as to obtain a yellow beam (not shown).

Specifically, in the operation mode in FIG. 3D, the third subarea 114_3, the first subarea 114_1, the second subarea 114_2 and the light penetrating area 114B of the wavelength conversion device 114 cut into the transmission path of the blue beam IB in sequence during a first time period, a second time period, a third time period and a fourth time period, respectively, wherein during the second time period, the red light source 112R is turned on and the blue light source 112B is turned off during the third time period and the fourth time period, the blue light source 112B is turned on and the red light source 112R is turned off. In addition, during the first time period, the red light source 112R and the blue light source 112B are both turned on to form the yellow beam (not shown). By continuously rotating the wavelength conversion device 114 and repeatedly and sequentially performing the operations in the first time period, the second time period, the third time period and the fourth time period, the light source module 110 continuously provides the yellow beam (not shown), the first red beam IR_1, the first green beam IG_1 and the blue beam IB, so as to form the illumination beam IW (the first illumination beam IW1). That is, the light source module 110 provides the illumination beam IW in a YRGB format in a continuous and sequential manner. Specifically, the operation mode of the embodiment in FIG. 3D is performed when, for example, the light source module 110 is in the first display mode (wide gamut mode), and the illumination beam IW (the first illumination beam IW1) corresponds to the first display mode. That is, the first red beam IR_1, the first green beam IG_1 and the blue beam IB all satisfy or are close to the DCI-P3 color gamut.

Figure 4:
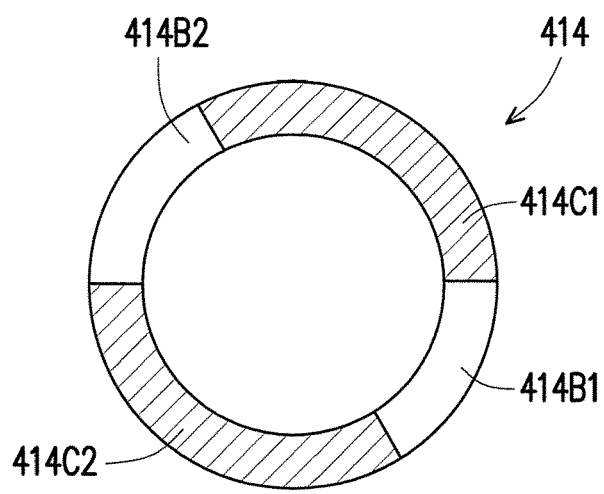
FIG. 4 illustrates a schematic view of a wavelength conversion device according to another embodiment.
Figure 5A:
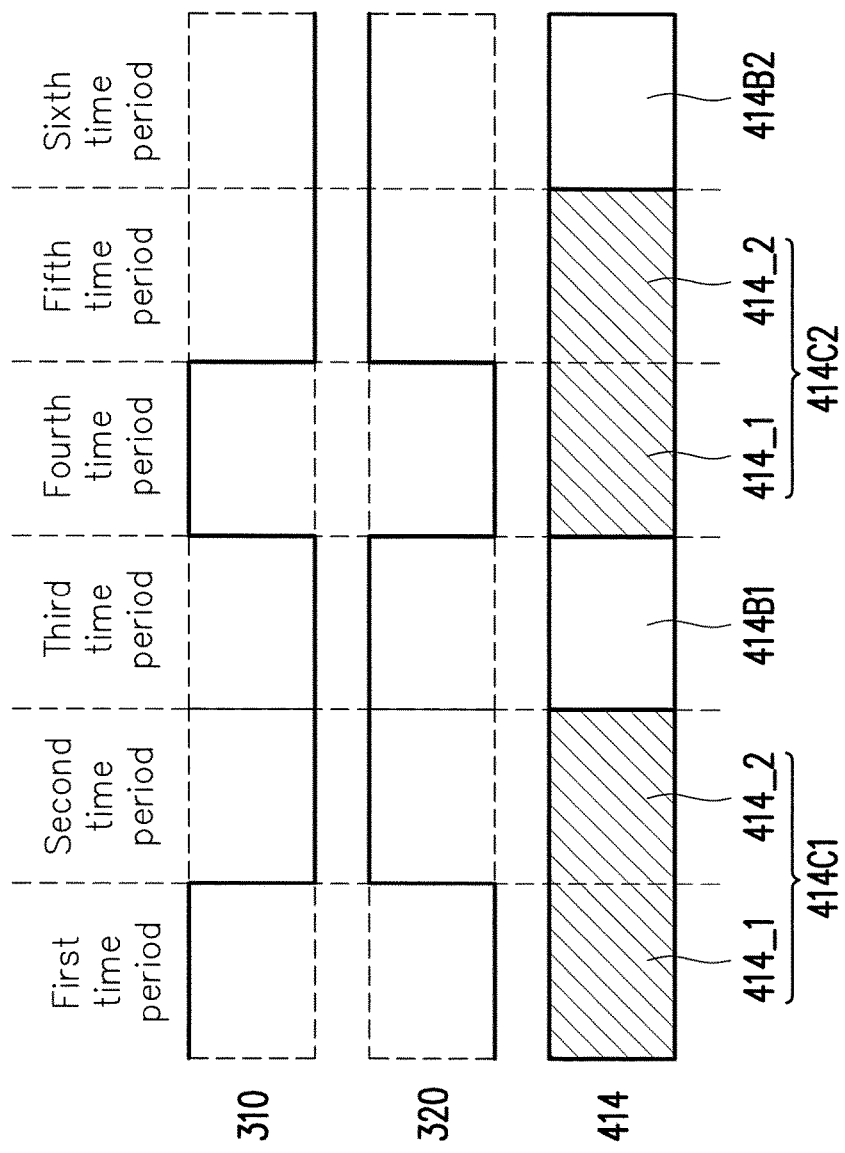
FIG. 5A to FIG. 5B illustrate schematic views of currents for driving light sources in different operation modes of a projection device using the wavelength conversion device in FIG. 4.
Figure 5B:
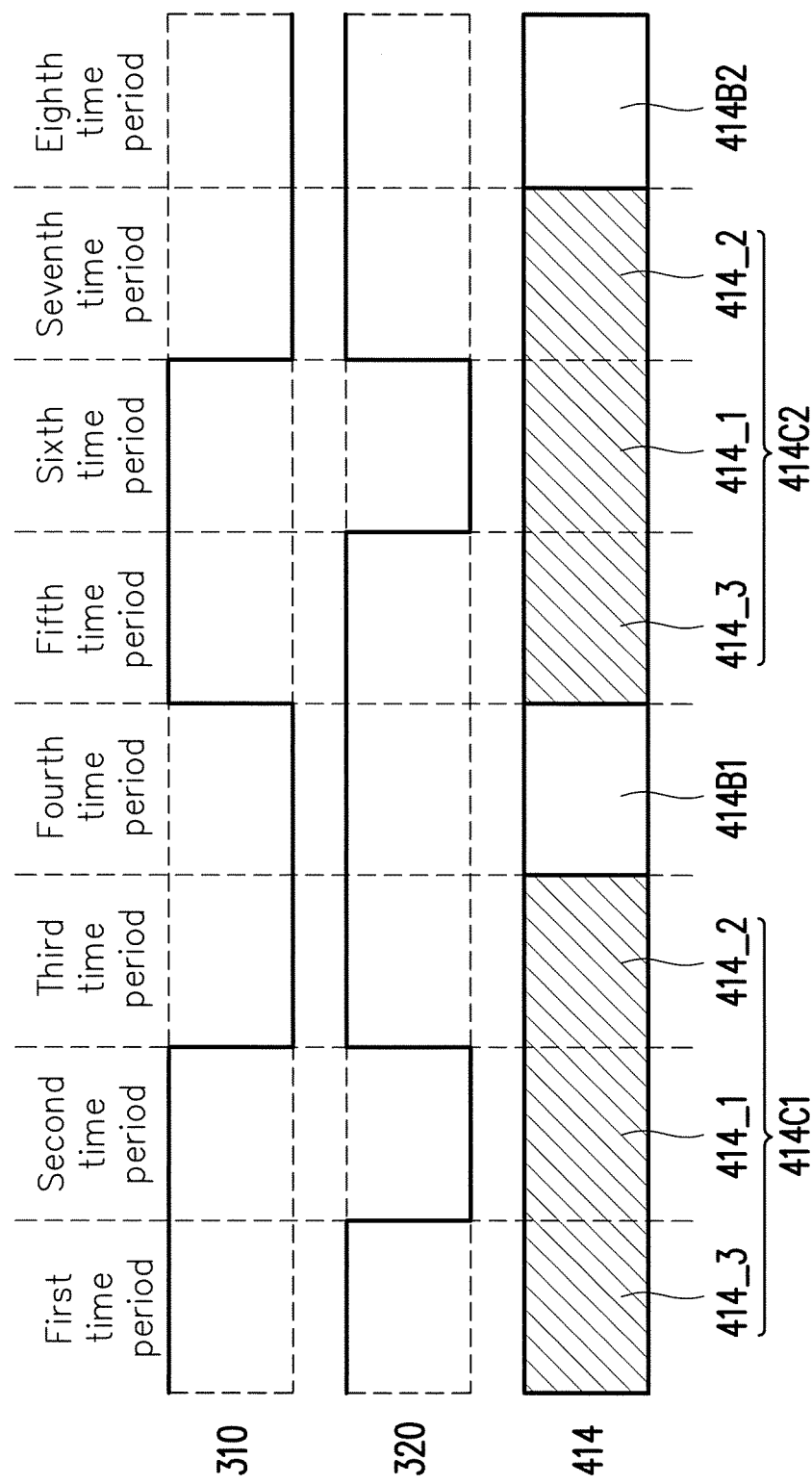

FIG. 4 illustrates a schematic view of a wavelength conversion device according to another embodiment. FIG. 5A to FIG. 5B illustrate schematic views of currents for driving light sources in different operation modes of a projection device using the wavelength conversion device in FIG. 4. Referring first to FIG. 4 and FIG. 5A together, the wavelength conversion device 114 in the projection device 100 in FIG. 1 may be replaced with a wavelength conversion device 414 in FIG. 4, and the wavelength conversion device 414 in FIG. 4 is similar to the wavelength conversion device 114 in the embodiment in FIG. 2. The components and relevant descriptions of the wavelength conversion device 414 may be understood with reference to the wavelength conversion device 114 in the embodiment in FIG. 1 and FIG. 2, and will be omitted herein. Differences between the wavelength conversion device 414 and the wavelength conversion device 114 are as follows. In the embodiment, at least one wavelength conversion area of the wavelength conversion device 414 is a plurality of wavelength conversion areas 414C1 and 414C2, and at least one light penetrating area of the wavelength conversion device 414 is a plurality of light penetrating areas 414B1 and 414B2. Moreover, the wavelength conversion areas 414C1 and 414C2 and the light penetrating areas 414B1 and 414B2 are alternately arranged; that is, on the wavelength conversion device 414, the wavelength conversion area 414C1, the light penetrating area 414B1, the wavelength conversion area 414C2 and the light penetrating area 414B2 are arranged in sequence in a ring shape.

Specifically, referring to FIG. 1 in combination with the operation mode of the embodiment in FIG. 5A, the wavelength conversion area 414C1 of the wavelength conversion device 414 includes a first subarea 414_1 and a second subarea 414_2, and the wavelength conversion area 414C2 of the wavelength conversion device 414 includes a first subarea 414_1 and a second subarea 4142. In the embodiment, on the wavelength conversion device 414, the first subarea 414_1 of the wavelength conversion area 414C1, the second subarea 414_2 of the wavelength conversion area 414C1, the light penetrating area 414B1, the first subarea 414_1 of the wavelength conversion area 414C2, the second subarea 414_2 of the wavelength conversion area 414C2 and the light penetrating area 414B2 are arranged in sequence in the ring shape, and cut into the transmission path of the blue beam IB by turns.

Similarly to the operation mode in FIG. 3A, in the operation mode in FIG. 5A, the first subarea 414_1 of the wavelength conversion area 414C1, the second subarea 414_2 of the wavelength conversion area 414C1, the light penetrating area 414B1, the first subarea 414_1 of the wavelength conversion area 414C2, the second subarea 414_2 of the wavelength conversion area 414C2 and the light penetrating area 414B2 of the wavelength conversion device 414 cut into the transmission path of the blue beam IB in sequence during a first time period, a second time period, a third time period, a fourth time period, a fifth time period and a sixth time period, respectively, wherein during the first time period and the fourth time period, the red light source 112R is turned on and the blue light source 112B is turned off; during the second time period, the third time period, the fifth time period and the sixth time period, the blue light source 112B is turned on and the red light source 112R is turned off. In addition, by continuously rotating the wavelength conversion device 414 and repeatedly and sequentially performing the operations in the first time period, the second time period, the third time period, the fourth time period, the fifth time period and the sixth time period, the light source module 110 continuously provides the first red beam IR_1, the first green beam IG_1, the blue beam IB, the first red beam IR_1, the first green beam IG_1 and the blue beam IB in sequence, so as to form the illumination beam IW (the first illumination beam IW1). That is, the light source module 110 provides the illumination beam IW in an RGBRGB format in a continuous and sequential manner. Specifically, the operation mode of the embodiment in FIG. 5A is performed when, for example, the light source module 110 is in the first display mode (wide gamut mode), and the illumination beam IW (the first illumination beam IW1) corresponds to the first display mode. That is, the first red beam IR_1, the first green beam IG_1 and the blue beam IB all satisfy or are close to the DCI-P3 gamut. In the embodiment, since RGB display is performed twice by one rotation of the wavelength conversion device 414, the screen refresh rate is higher, and a problem of color breaking is effectively prevented from occurring in the projection device. In some embodiments, color display may be performed more times by one rotation of the wavelength conversion device 414, so as to increase the screen refresh rate. The invention is not limited thereto.

Next, referring to FIG. 5B, FIG. 1 and FIG. 4 together, in the operation mode in FIG. 5B, the wavelength conversion area 414C1 includes a first subarea 414_1, a second subarea 414_2 and a third subarea 414_3, and the wavelength conversion area 414C2 includes a first subarea 414_1, a second subarea 414_2 and a third subarea 414_3. In the embodiment, the third subarea 414_3 of the wavelength conversion area 414C1, the first subarea 414_1 of the wavelength conversion area 414C1, the second subarea 414_2 of the wavelength conversion area 414C1, the light penetrating area 414B1, the third subarea 414_3 of the wavelength conversion area 414C2, the first subarea 414_1 of the wavelength conversion area 414C2, the second subarea 414_2 of the wavelength conversion area 414C2 and the light penetrating area 414B2 are arranged in sequence in a ring shape, and cut into the transmission path of the blue beam IB by turns.

Similarly to the operation mode in FIG. 3D, in the operation mode in FIG. 5B, the third subarea 414_3 of the wavelength conversion area 414C1, the first subarea 414_1 of the wavelength conversion area 414C1, the second subarea 414_2 of the wavelength conversion area 414C1, the light penetrating area 414B1, the third subarea 414_3 of the wavelength conversion area 414C2, the first subarea 414_1 of the wavelength conversion area 414C2, the second subarea 414_2 of the wavelength conversion area 414C2 and the light penetrating area 414B2 of the wavelength conversion device 414 cut into the transmission path of the blue beam IB in sequence during a first time period, a second time period, a third time period, a fourth time period, a fifth time period, a sixth time period, a seventh time period and an eighth time period, respectively, wherein during the second time period and the sixth time period, the red light source 112R is turned on and the blue light source 112B is turned off; during the third time period, the fourth time period, the seventh time period and the eighth time period the blue light source 112B is turned on and the red light source 112R is turned off. In addition, during the first time period and the fifth time period, the red light source 112R and the blue light source 112B are both turned on. That is, the current 310 for driving the red light source 112R and the current 320 for driving the blue light source 112B are both at high levels, so as to obtain a yellow beam (not shown). By continuously rotating the wavelength conversion device 414 and repeatedly and sequentially performing the operations in the first time period, the second time period, the third time period, the fourth time period, the fifth time period, the sixth time period, the seventh time period and the eighth time period, the light source module 110 continuously provides the yellow beam (not shown), the first red beam IR_1, the first green beam IG_1, the blue beam IB, the yellow beam (not shown), the first red beam IR_1, the first green beam IG_1 and the blue beam IB in sequence, so as to form the illumination beam IW (the first illumination beam IW1). That is, the light source module 110 provides the illumination beam IW in a YRGBYRGB format in a continuous and sequential manner. Specifically, the operation mode of the embodiment in FIG. 5B is performed when, for example, the light source module 110 is in the first display mode (wide gamut mode), and the illumination beam IW (the first illumination beam IW1) corresponds to the first display mode. That is, the first red beam IR_1, the first green beam IG_1 and the blue beam IB all satisfy or are close to the DCI-P3 gamut. In addition, similarly to the embodiment in FIG. 5A, since YRGB display is performed twice by one rotation of the wavelength conversion device 414, the problem of color breaking is effectively prevented from occurring in the projection device.

Figure 7:
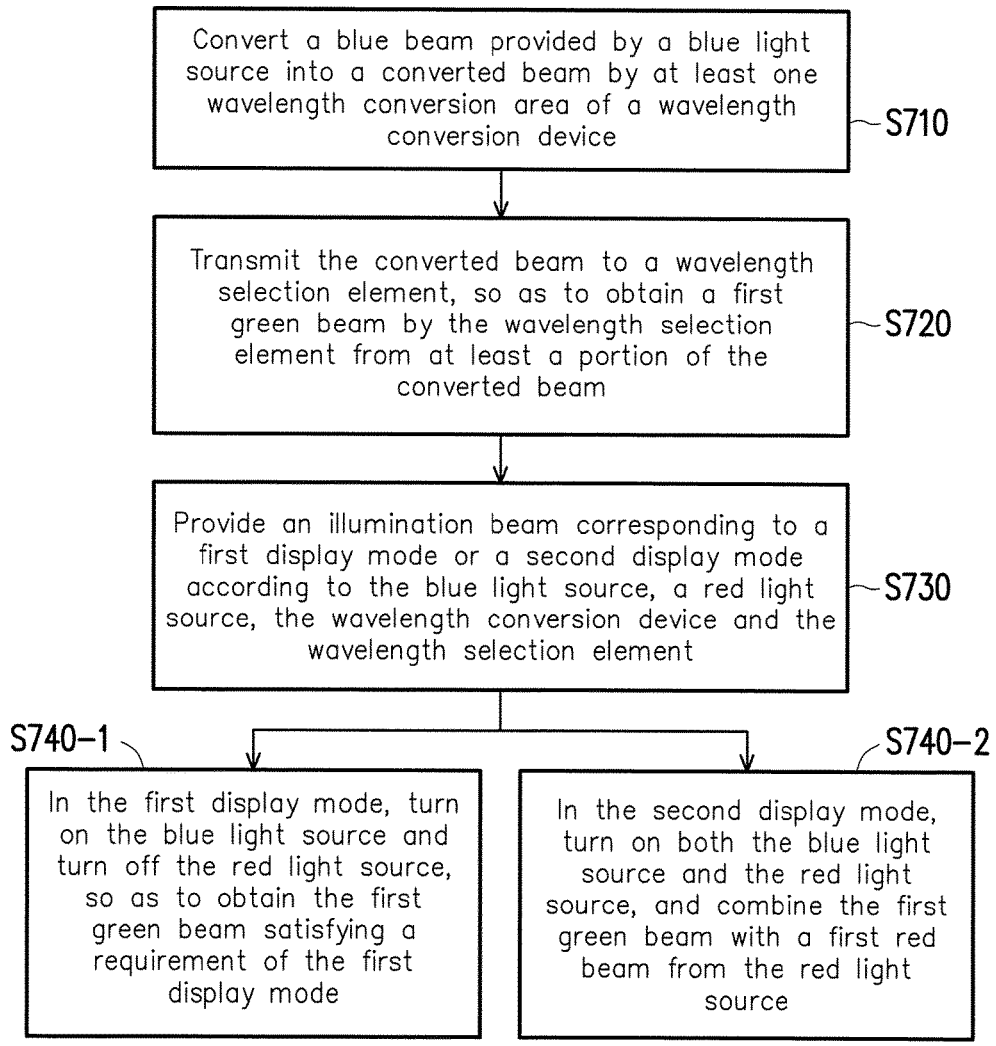
FIG. 7 illustrates a schematic flowchart of a driving method of a light source module according to an embodiment of the invention.

FIG. 7 illustrates a schematic flowchart of a driving method of a light source module according to an embodiment of the invention. Referring to FIG. 7, in the embodiment, the driving method of a light source module is at least applicable to the light source module 110 in FIG. 1 and the light source module includes a blue light source and a red light source and is configured to provide an illumination beam. Specifically, the driving method of a light source module includes the following steps. In step S710, a blue beam provided by the blue light source is converted into a converted beam by at least one wavelength conversion area of a wavelength conversion device. Next, in step S720, the converted beam is transmitted to a wavelength selection element so that a first green beam is obtained by the wavelength selection element from at least a part of the converted beam. In step S730, according to the blue light source, the red light source, the wavelength conversion device and the wavelength selection element, the illumination beam corresponding to a first display mode or a second display mode is provided. In step S740-1, in the first display mode, the blue light source is turned on and the red light source is turned off, so as to obtain the first green beam satisfying a requirement of the first display mode. In step S740-2, in the second display mode, the blue light source and the red light source are both turned on, and the first green beam is combined with a first red beam from the red light source. Specifically, details of the driving method of a light source module according to the embodiments of the invention will be omitted since sufficient teachings, suggestions and descriptions of implementation can be obtained from the descriptions of the embodiments in FIG. 1 to FIG. 6.

Figure 8:
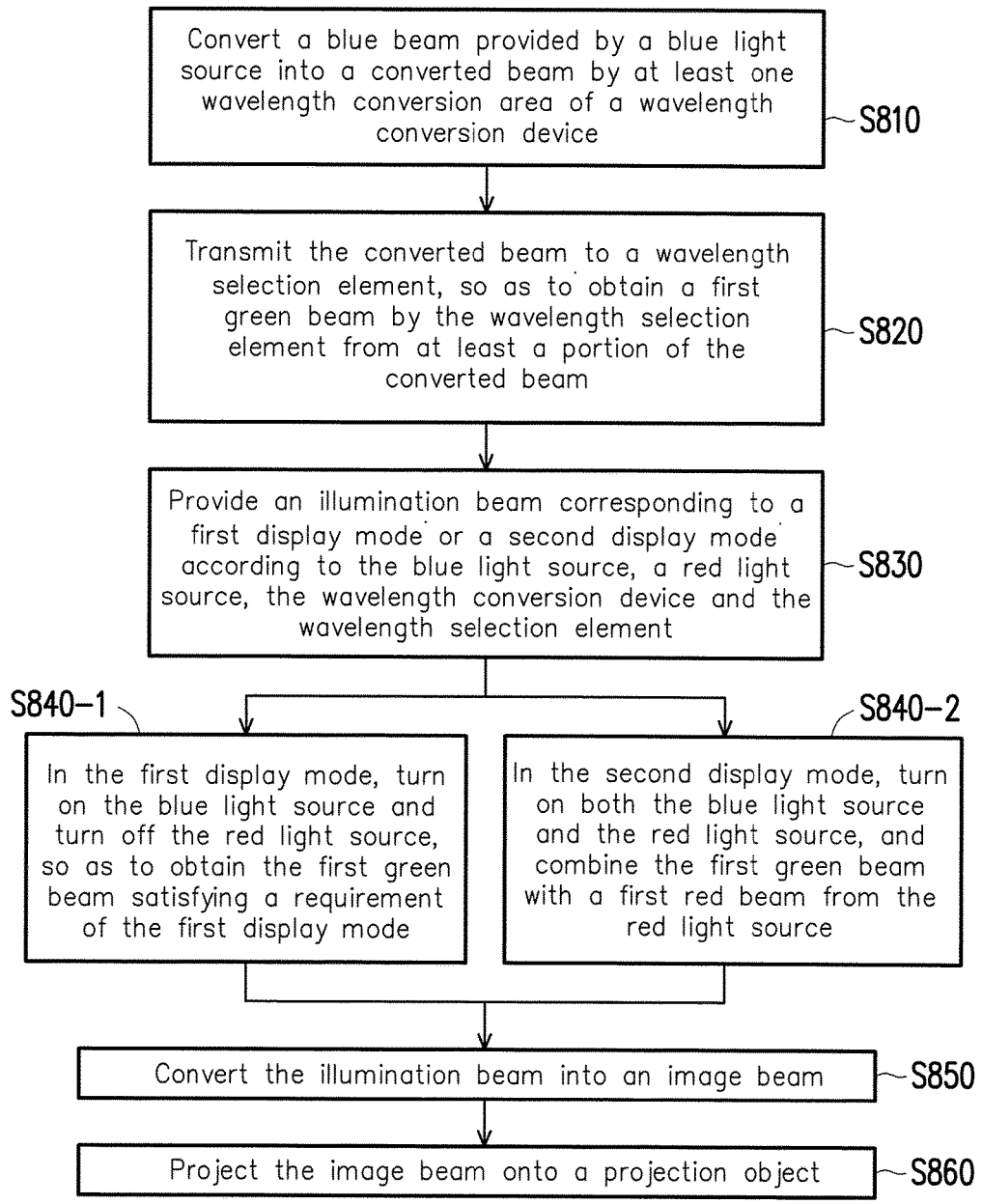
FIG. 8 illustrates a schematic flowchart of a driving method of a projection device according to an embodiment of the invention.

FIG. 8 illustrates a schematic flowchart of a driving method of a projection device according to an embodiment of the invention. Referring to FIG. 8, in the embodiment, the driving method of a projection device is at least applicable to the projection device 100 in FIG. 1. Specifically, the driving method of a projection device includes the following steps and the projection device includes a light source module, and the light source module includes a blue light source and a red light source and is configured to provide an illumination beam. In step S810, a blue beam provided by the blue light source is converted into a converted beam by at least one wavelength conversion area of a wavelength conversion device in the light source module. Next, in step S820, the converted beam is transmitted through a wavelength selection element so that at least a part of the converted beam forms a first green beam. In step S830, according to the blue light source, the red light source, the wavelength conversion device and the wavelength selection element, an illumination beam corresponding to a first display mode or an illumination beam corresponding to a second display mode is provided by the light source module. In step S840-1, in the first display mode, the blue light source is turned on and the red light source is turned off, so as to obtain the first green beam satisfying a requirement of the first display mode. In step S840-2, in the second display mode, the blue light source and the red light source are both turned on, and the first green beam is combined with a first red beam from the red light source. In addition, in step S850, the illumination beam is converted into an image beam. Then, in step S860, the image beam is projected onto a projection object. Specifically, details of the driving method of a projection device according to the embodiments of the invention will be omitted since sufficient teachings, suggestions and descriptions of implementation can be obtained from the descriptions of the embodiments in FIG. 1 to FIG. 6.

In summary, the embodiments of the invention at least have one of the following advantages or effects. In the light source module and the driving method thereof as well as the projection device and the driving method thereof according to the embodiments of the invention, at least one wavelength conversion area of the wavelength conversion device is configured to convert the blue beam into the converted beam, and the converted beam is transmitted to the wavelength selection element so that obtain a first green beam by the wavelength selection element from at least a portion of the converted beam. According to the blue light source, the red light source, the wavelength conversion device and the wavelength selection element, the light source module provides the illumination beam corresponding to the first display mode or the second display mode. In the first display mode, the blue light source is turned on and the red light source is turned off, so as to obtain the first green beam satisfying a requirement of the first display mode. In the second display mode, the blue light source and the red light source are both turned on, and the first green beam is combined with the first red beam. In the exemplary embodiments of the invention, according to actual requirements, the user may make the light source module provide the illumination beam corresponding to different display modes, such as the wide gamut display mode and the high brightness display mode, so as to meet various user needs. In addition, the light source module is capable of obtaining a desired colored light by filtration with only the fluorescence wheel and with no filter color wheel. Thus, the cost is effectively lowered and energy loss is effectively reduced. Furthermore, the problem of spoke light on the filter color wheel is avoided, and color purity performance is effectively improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, configured to provide an illumination beam, the light source module comprising a blue light source, a red light source, a wavelength conversion device and a wavelength selection element, wherein the blue light source is configured to provide a blue beam;

the red light source is configured to provide a first red beam;

the wavelength conversion device is disposed on a transmission path of the blue beam, the wavelength conversion device has at least one wavelength conversion area and at least one light penetrating area, the at least one wavelength conversion area and the at least one light penetrating area cut into the transmission path of the blue beam by turns, the at least one light penetrating area is configured to allow the blue beam to pass therethrough, and the at least one wavelength conversion area is configured to convert the blue beam into a converted beam; and the wavelength selection element is disposed on a transmission path of the converted beam, the converted beam is transmitted to the wavelength selection element so that a first green beam is obtained by the wavelength selection element from at least a portion of the converted beam, and, according to the blue light source, the red light source, the wavelength conversion device and the wavelength selection element, the light source module provides the illumination beam corresponding to a first display mode or a second display mode.

2. The light source module according to claim 1, wherein a wavelength range of the converted beam at least covers a wavelength range of the first green beam.

3. The light source module according to claim 1, wherein in the first display mode, the blue light source is turned on and the red light source is turned off, so as to obtain the first green beam satisfying a requirement of the first display mode.

4. The light source module according to claim 1, wherein in the second display mode, when the at least one wavelength conversion area cuts into the transmission path of the blue beam, the red light source and the blue light source are both turned on to provide the first red beam and the blue beam, and the blue beam is configured to generate the first green beam, wherein the first red beam and the first green beam are combined to obtain a second red beam satisfying a requirement of the second display mode, and light intensity of the first green beam is smaller than or equal to one half that of the first red beam.

5. The light source module according to claim 1, wherein in the second display mode, when the at least one wavelength conversion area cuts into the transmission path of the blue beam, the red light source and the blue light source are both turned on to provide the first red beam and the blue beam, and the blue beam is configured to generate the first green beam, wherein the first red beam and the first green beam are combined to obtain a second green beam satisfying a requirement of the second display mode, and light intensity of the first red beam is smaller than or equal to one half that of the first green beam.

6. The light source module according to claim 1, wherein each of the at least one wavelength conversion area comprises at least one first subarea and at least one second subarea, when the at least one first subarea cuts into the transmission path of the blue beam, the red light source is turned on to provide the first red beam, when the at least one second subarea cuts into the transmission path of the blue beam, the blue light source is turned on to provide the blue beam and the blue beam is configured to generate the first green beam, and when the at least one light penetrating area cuts into the transmission path of the blue beam, the blue light source is turned on and the red light source is turned off, so as to allow the blue beam to pass through the at least one light penetrating area.

7. The light source module according to claim 6, wherein the each of the at least one wavelength conversion area further comprises at least one third subarea, and when the at least one third subarea cuts into the transmission path of the blue beam, the red light source and the blue light source are both turned on to respectively provide the first red beam and the blue beam, and the blue beam is configured to generate the first green beam, wherein the first red beam and the first green beam are combined to obtain a yellow beam.

8. The light source module according to claim 6, wherein the at least one first subarea is a plurality of first subareas, the at least one second subarea is a plurality of second subareas, and the plurality of first subareas and the plurality of second subareas are alternately arranged.

9. The light source module according to claim 1, wherein the at least one wavelength conversion area is a plurality of wavelength conversion areas, the at least one light penetrating area is a plurality of light penetrating areas, and the plurality of wavelength conversion areas and the plurality of light penetrating areas are alternately arranged.

10. A projection device, comprising:
a light source module, configured to provide an illumination beam, the light source module comprising a blue light source, a red light source, a wavelength conversion device and a wavelength selection element, wherein
the blue light source is configured to provide a blue beam;
the red light source is configured to provide a first red beam;
the wavelength conversion device is disposed on a transmission path of the blue beam, the wavelength conversion device has at least one wavelength conversion area and at least one light penetrating area, the at least one light penetrating area is configured to allow the blue beam to pass therethrough, and the at least one wavelength conversion area is configured to convert the blue beam into a converted beam; and
the wavelength selection element is disposed on a transmission path of the converted beam, the converted beam is transmitted to the wavelength selection element so that a first green beam is obtained by the wavelength selection element from at least a portion of the converted beam, and, according to the blue light source, the red light source, the wavelength conversion device and the wavelength selection element, the light source module provides the illumination beam corresponding to a first display mode or a second display mode;
an imaging element, disposed on a transmission path of the illumination beam, configured to convert the illumination beam into an image beam; and
a projection lens, disposed on a transmission path of the image beam, configured to project the image beam onto a projection object.

11. A driving method of a light source module, wherein the light source module includes a blue light source and is configured to provide an illumination beam, the driving method of a light source module comprising:
converting a blue beam provided by the blue light source into a converted beam by at least one wavelength conversion area of a wavelength conversion device;
transmitting the converted beam to a wavelength selection element so as to obtain a first green beam by the wavelength selection element from at least a portion of the converted beam; and
providing the illumination beam corresponding to a first display mode or a second display mode according to the blue light source, a red light source, the wavelength conversion device and the wavelength selection element.

12. The driving method of a light source module according to claim 11, wherein a wavelength range of the converted beam at least covers a wavelength range of the first green beam.

13. The driving method of a light source module according to claim 11, comprising: in the first display mode, turning on the blue light source and turning off the red light source, so as to obtain the first green beam satisfying a requirement of the first display mode.

14. The driving method of a light source module according to claim 11, further comprising:
in the second display mode, turning on both the red light source and the blue light source to respectively provide the first red beam and the blue beam, and generating the first green beam from the blue beam, wherein the first red beam and the first green beam are combined to obtain a second red beam satisfying a requirement of the second display mode, and light intensity of the first green beam is smaller than or equal to one half that of the first red beam.

15. The driving method of a light source module according to claim 11, further comprising:
in the second display mode, turning on both the red light source and the blue light source to respectively provide the first red beam and the blue beam, and generating the first green beam from the blue beam, wherein the first red beam and the first green beam are combined to obtain a second green beam satisfying a requirement of the second display mode, and light intensity of the first red beam is smaller than or equal to one half that of the first green beam.

16. The driving method of a light source module according to claim 11, further comprising:
turning on the red light source to provide the first red beam when at least one first subarea of each of the at least one wavelength conversion area cuts into a transmission path of the blue beam;
turning on the blue light source to provide the blue beam, and generating the first green beam from the blue beam when at least one second subarea of each of the at least one wavelength conversion area cuts into the transmission path of the blue beam; and
turning on the blue light source to provide the blue beam when at least one light penetrating area of the wavelength conversion device cuts into the transmission path of the blue beam.

17. The driving method of a light source module according to claim 16, further comprising:
turning on both the red light source and the blue light source to respectively provide the first red beam and the blue beam, and generating the first green beam from the blue beam when at least one third subarea of each of the at least one wavelength conversion area cuts into the transmission path of the blue beam, wherein the first red beam and the first green beam are combined to obtain a yellow beam.

18. A driving method of a projection device, wherein the projection device comprises a light source module, and the light source module includes a blue light source and is configured to provide an illumination beam, the driving method of a projection device comprising:

converting a blue beam provided by the blue light source into a converted beam by at least one wavelength conversion area of a wavelength conversion device;

transmitting the converted beam to a wavelength selection element so as to obtain a first green beam by the wavelength selection element from at least a portion of the converted beam;

providing the illumination beam corresponding to a first display mode or a second display mode according to the blue light source, a red light source, the wavelength conversion device and the wavelength selection element;

converting the illumination beam into an image beam; and projecting the image beam onto a projection object.

* * * * *